United States Patent [19]

Okabayashi et al.

[11] Patent Number: 4,964,912
[45] Date of Patent: Oct. 23, 1990

[54] HEAT-CURING CEMENT COMPOSITION, METHOD OF HARDENING SAME, AND HARDENED BODY FORMED THEREFROM

[75] Inventors: Shigeo Okabayashi; Mototaka Egawa; Masao Yuge, all of Ube, Japan

[73] Assignee: Ube Industries, Ltd., Japan

[21] Appl. No.: 369,620

[22] Filed: Jun. 21, 1989

[30] Foreign Application Priority Data

Jun. 28, 1988 [JP] Japan ................... 63-158102

[51] Int. Cl.$^5$ .............................................. C04B 7/06
[52] U.S. Cl. .................... 106/705; 106/89; 106/103; 106/707; 106/715; 106/735; 106/782; 106/789
[58] Field of Search ................. 106/76, 77, 78, 89, 106/97, 98, 103, 104

[56] References Cited

U.S. PATENT DOCUMENTS

| | | | |
|---|---|---|---|
| 3,447,937 | 6/1969 | Hersey et al. | 106/89 |
| 4,028,126 | 6/1977 | Mori et al. | 106/100 |
| 4,230,499 | 10/1980 | Nakagawa et al. | 106/90 |
| 4,451,295 | 5/1984 | Sprouse | 106/89 |

FOREIGN PATENT DOCUMENTS 1267285 of 0000 United Kingdom .
1498057 of 0000 United Kingdom .
2063240 of 0000 United Kingdom .

*Primary Examiner*—William R. Dixon, Jr.
*Assistant Examiner*—Chris Gallo
*Attorney, Agent, or Firm*—Finnegan, Henderson, Farabow, Garrett & Dunner

[57] ABSTRACT

A heat-curing cement composition comprising 60 to 75% by weight of $3CaO.SiO_2$, in which the total content of $3CaO.Al_2O_3$ and $4CaO.Al_2O_3.Fe_2O_3$ is lower than 10% by weight, the alkali content is lower than 0.2% by weight as the $Na_2O$ equivalent, the balance is composed mainly of $2CaO.SiO_2$ and gypsum, and the Blain specific surface area is 3500 to 5500 cm$^2$/g. This cement composition provides a hardened body when heat-cured under a high temperature of 35° to 85° C.

5 Claims, No Drawings

HEAT-CURING CEMENT COMPOSITION, METHOD OF HARDENING SAME, AND HARDENED BODY FORMED THEREFROM

BACKGROUND OF THE INVENTION

1. Field of the Invention

The present invention relates to a heat-curing cement composition, a method of hardening this composition, and a hardened body formed from this composition. More particularly, the present invention relates to a material in which the amount of mixing water necessary for obtaining a predetermined workability is small, for which the strength-manifesting properties under heating conditions are excellent, and which can be used for the production of cement secondary products (piles, Hume concrete pipes, panels and the like), construction materials, fiber-reinforced composite products and the like, and to a method of hardening this material and a hardened product formed therefrom.

2. Description of the Related Art

As the material for obtaining a high-strength product by mixing and molding at a normal temperature and curing at a high temperature, a composition comprising ordinary Portland cement or blended cement, a water-reducing agent and, if necessary, anhydrous gypsum, amorphous or crystalline silica and an expansive admixture is used, and no special consideration is paid to the clinker or cement used as the base.

As the means for promoting the manifestation of strength in a heat-cured product, a method in which the powder fineness of the cement is increased and a method in which a curing promoter or the like additive is added are adopted singly or in combination. But, when an ordinary cement is used, the workability of the paste, mortar or concrete after mixing is greatly reduced, and the physical properties of the hardened mortar or concrete are remarkably reduced. Therefore, the development of a cement having an excellent workability, strength-manifesting properties, and adhesiveness is urgently desired.

SUMMARY OF THE INVENTION

Therefore, a primary object of the present invention is to provide a cement composition for preparing a high-strength cement product by heat-curing, which has an excellent workability and strengthmanifestion properties. Namely, the present invention has been completed as the result of research conducted with a view to developing a cement composition capable of maintaining a required workability with a much reduced amount of mixing water, compared with the amount of mixing water used in the conventional technique, regardless of the presence or absence of a water-reducing agent, a fluidizing agent, and a promoter, and manifesting a high strength under a heat-curing temperature of 35° to 85° C.

More specifically, in accordance with the present invention, there is provided a heat-curing cement composition which comprises 60 to 75% by weight of $3CaO.SiO_2$ (hereinafter referred to as "$C_3S$"), in which the total content of $3CaO.Al_2O_3$ (hereinafter referred to as "$C_3A$") and $4CaO.Al_2O_3.Fe_2O_3$ (hereinafter referred to as "$C_4AF$") is lower than 10% by weight, the alkali content is lower than 0.2% by weight as the $NaO_2O$ equivalent, and the balance is composed mainly of $2CaO.SiO_2$ (hereinafter referred to as "$C_2S$") and gypsum, the gypsum being preferably added so that the content of $SO_3$ in the cement is 1.0 to 2.0%, and the cement composition being pulverized so that the Blain specific surface area is 3500 to 5500 cm$^2$/g. Furthermore, in accordance with the present invention, there are provided a hardening method in which this cement composition is heat-cured under a high temperature of 35° to 85° C., and the hardened paste, mortar or concrete obtained from this cement composition by using this hardening method.

DESCRIPTION OF THE PREFERRED EMBODIMENTS

The heat-curing cement of the present invention comprises 60 to 75% by weight of $C_3S$, in which the total content of $C_3A$ and $C_4AF$ is lower than 10% by weight, the alkali content is lower than 0.2% by weight as the $Na_2O$ equivalent, and the balance is composed mainly of $C_2S$ and gypsum.

If the $C_3S$ content is lower than 60% by weight, the strength-manifesting property after heat-curing is reduced. A characteristic feature of the cement of the present invention is that the total content of $C_3A$ and $C_4AF$, i.e., the content of the interstitial phase, is very low. If the $C_3S$ content in the cement exceeds 75% by weight, granulation in a kiln becomes difficult at the calcination step and an abnormal increase of free lime in the clinker occurs, and thus, problems arise in connection with the calcination and physical properties.

The total content of $C_3A$ and $C_4AF$ must be lower than 10% by weight. If the total content of $C_3A$ and $C_4AF$ is higher than 10% by weight, the amount of mixing water necessary for obtaining a predetermined workability is increased, with the result that the manifestation of high strength is inhibited.

In the present invention, the alkali content must be lower than 0.2% by weight as the $Na_2O$ equivalent $[0.658 \times K_2O (\%) + Na_2O (\%)]$ (hereinafter referred to as "$R_2O$") In an ordinary cement, if the alkali content is reduced, the strength-manifesting property is lowered, but if a small-interstitial-phase clinker is used as in the present invention, a reduction of the alkali content is necessary for increasing the strength-manifesting property at the heat-curing step. This effect is enhanced by limiting the amount of gypsum added.

The balance is composed mainly of $C_2S$ and gypsum. Preferably, the amount of gypsum is such that the content of $SO_3$ in the cement is 1.0 to 2.0% by weight. The form of the gypsum is not particularly critical, and a dihydrate (gypsum) and an anhydrate can be used. In view of the strength-manifesting property under heat-curing conditions, most preferably the gypsum content is 1.0 to 2.0% by weight as $SO_3$.

Note, a part of the cement composition of the present invention can be replaced by a siliceous admixture such as blast furnace slag, fly ash or silica fume. The replacement amount differs according to the particular admixture. Preferably, the replacement amount of blast furnace slag is up to 50% by weight or the replacement amount of fly ash or silica fume is up to 30% by weight.

The grain size of the cement composition of the present invention is preferably such that the Blain specific surface area is 3500 to 5500 cm$^2$/g. If the Blain specific surface area is smaller than 3500 cm$^2$/g, the manifestation of the strength is delayed, and to obtain a desired high strength, the curing temperature must be raised or the curing time prolonged. If the Blain specific surface area exceeds 5500 cm$^2$/g, the reduction of the workability becomes conspicuous and an addition of a set regulator (retarder) becomes necessary, and in any case, the amount of mixing water must be increased to obtain a predetermined workability, and thus the strength of the hardened mortar or concrete is inevitably reduced.

The cement composition of the present invention is mixed with water and, if necessary, materials customarily used for the production of a mortar or concrete, such as an ordinary aggregate or light aggregate (fine aggregate and/or a coarse aggregate; the aggregate/cement ratio is from 0.1 to 6) and various concrete admixtures (a water-reducing agent, an AE water-reducing agent, a superplasticizer, an accelerator, a retarder, a shrinkage-reducing agent, a fiber reinforcer and the like), whereby a paste, mortar or concrete is prepared. From the viewpoint of the manifestation of the strength, preferably the amount of mixing water is as small as possible within the range capable of maintaining the necessary workability. The formed paste, mortar or concrete is heat cured to effect hardening, and preferably the heat curing temperature is 35° to 85° C. If the heat curing temperature is lower than 35° C., a long time is required to obtain a high strength, and even if the heat curing temperature is higher than 85° C., a substantial improvement of the strength or the strength-manifesting property cannot be obtained. The heat curing is accomplished by immersion in warm water or by steam curing, but the curing method is not particularly critical. The curing time differs according to the curing temperature, but from the practical viewpoint, preferably the curing time is about 3 to about 50 hours.

The hardened paste, mortar or concrete of the present invention can be obtained by mixing the cement composition of the present invention with water and, if necessary, an ordinary aggregate or a light aggregate (a fine aggregate and/or a coarse aggregate; the aggregate/cement ratio is from 0.1 to 6) and various concrete admixtures (such as a water-reducing agent, an AE water-reducing agent, a superplasticizer, an accelerator, a retarder, an expansive additive, a shrinkage-reducing agent and a reinforcing fiber), and curing the mixture under a high temperature of 35° to 85° C.

In the cement of the present invention, the contents of $C_3S$, $C_3A$ and $C_4AF$ and the alkali content, and preferably the gypsum content and furthermore the fineness, are limited, and by the synergistic effect of these limitations, it becomes possible to manifest high strength by the high-temperature curing. Moreover, the effect of the present invention is promoted by an appropriate use of various admixtures (materials) customarily used for the production of concrete, and therefore, the present invention is advantageous over the conventional techniques in that the strength is increased, the size of the product is diminished, and the weight is reduced.

The present invention will now be described in detail with reference to the following examples, that by no means limit the scope of the invention.

Examples 1 through 3 and Comparative Examples 1 through 7

To 100 parts of a cement (Blain specific surface area=4300±150 $cm^2/g$) having a composition shown in Table 1 were added 0.1 part by weight of a commercially available water-reducing agent (main component=hydroxycarboxylic acid salt), 50 parts by weight of Toyoura standard sand, and a predetermined amount of water, and the mixture was mixed to obtain a mortar in which the table flow value according to JIS R-5201 was 220±10 mm. This mortar was packed in a mold (inner size=4 cm×4 cm×16 cm), curing was carried out at 40° C. for 24 hours, and the obtained hardened mortar was subjected to the compression strength test. The composition of the sample cement is shown in Table 1, and the mortar compression strength is shown in Table 2.

TABLE 1

| | Composition (% by weight) | | | | | |
|---|---|---|---|---|---|---|
| | $C_3S$ | $C_2S$ | $C_3A$ | $C_4AF$ | $SO_3$ | $R_2O$ |
| Example 1 | 67 | 21 | 6 | 1 | 1.6 | 0.11 |
| Example 2 | 72 | 15 | 1 | 7 | 1.3 | 0.15 |
| Example 3 | 69 | 17 | 5 | 2 | 1.5 | 0.19 |
| Comparative Example 1 | 58 | 27 | 8 | 2 | 1.8 | 0.49 |
| Comparative Example 2 | 66 | 9 | 9 | 9 | 2.8 | 0.58 |
| Comparative Example 3 | 63 | 14 | 0 | 17 | 1.9 | 0.52 |
| Comparative Example 4 | 49 | 33 | 4 | 9 | 1.7 | 0.42 |
| Comparative Example 5 | 71 | 20 | 5 | 1 | 1.5 | 0.38 |
| Comparative Example 6 | 68 | 22 | 6 | 2 | 1.4 | 0.58 |
| Comparative Example 7 | 70 | 20 | 5 | 2 | 1.5 | 0.77 |

TABLE 2

| | Water/Cement Ratio (%) | Flow Value (mm) | Compression Strength (kgf/cm$^2$) |
|---|---|---|---|
| Example 1 | 34 | 228 | 963 |
| Example 2 | 33 | 225 | 940 |
| Example 3 | 33 | 226 | 955 |
| Comparative Example 1 | 36 | 212 | 805 |
| Comparative Example 2 | 41 | 218 | 722 |
| Comparative Example 3 | 38 | 214 | 783 |
| Comparative Example 4 | 39 | 211 | 693 |
| Comparative Example 5 | 34 | 224 | 861 |
| Comparative Example 6 | 34 | 219 | 844 |
| Comparative Example 7 | 35 | 217 | 803 |

As apparent from the results obtained in Examples 1 through 3 and Comparative Examples 1 through 7, the cement composition in which the $C_3S$ content is increased and the contents of the interstitial phase ($C_2A$ and $C_4AF$) and the alkali are controlled has a superior strength-manifesting property.

In the conventional cements (the alkali content is lower than about 1% as $R_2O$), the strength is generally improved with an increase of the amount of the alkali, but in case of a high-$C_3S$ and low-interstitial-phase cement as in the present invention, for the manifestation of the strength under high-temperature curing conditions, calcium silicate hydrate as the main hydrate exerts a more important function than in the conventional cements, and to optimize the speed of formation of this hydrate and the crystal form of the hydrate, the alkali content (as $R_2O$) must be controlled to a level lower than 0.2% by weight.

Examples 4 and 5

A mortar was prepared in the same manner as described in Example 1 except that calcium chloride was further added in an amount of 1.0% by weight or 2.0% by weight to the cement, and the compression strength was measured in the same manner as described in Example 1. The results are shown in Table 3.

TABLE 3

| | Amount (% by weight) of Added Calcium Chloride | Water/Cement Ratio (%) | Flow Value (mm) | Compressive Strength (kgf/cm$^2$) |
|---|---|---|---|---|
| Example 1 | not added | 34 | 228 | 963 |
| Example 4 | 1.0 | 35 | 219 | 1052 |
| Example 5 | 2.0 | 35 | 222 | 1095 |

Examples 6 through 11 and Comparative Examples 8 through 11

A mortar was prepared and tested in the same manner as described in Example 1, except that the fineness of the cement was changed to 3320 to 7710 cm$^2$/g and the amount of gypsum added was changed to 0.5 to 2.6% by weight as SO$_3$ in the cement. Note, the contents of C$_3$S, C$_2$S, C$_3$A, C$_4$AF, and R$_2$O in the sample cement were adjusted to 64 to 69% by weight, 20 to 22% by weight, 4 to 7% by weight, 0 to 2% by weight, and 0.09 to 0.12% by weight, respectively. The results of the measurement of the compression strength are shown in Table 4.

TABLE 4

| | Blain Specific Surface Area (cm$^2$/g) | SO$_3$ Content (% by weight) | Water/Cement Ratio (%) | Flow Value (mm) | Compressive Strength (kgf/cm$^2$) |
|---|---|---|---|---|---|
| Example 6 | 3980 | 1.6 | 32 | 215 | 943 |
| Example 7 | 4530 | 1.5 | 34 | 214 | 937 |
| Example 8 | 5210 | 1.4 | 36 | 212 | 963 |
| Comparative Example 8 | 3320 | 1.3 | 31 | 223 | 787 |
| Comparative Example 9 | 7710 | 1.5 | 39 | 228 | 635 |
| Example 9 | 4520 | 1.3 | 33 | 227 | 923 |
| Example 10 | 4320 | 1.5 | 33 | 226 | 942 |
| Example 11 | 4010 | 1.8 | 33 | 211 | 956 |
| Comparative Example 10 | 4630 | 2.6 | 33 | 214 | 823 |
| Example 11 | 4210 | 0.5 | 36 | 218 | 742 |

Examples 12 through 14 and Comparative Examples 12 through 15

To 100 parts by weight of the cement of Example 1 or Comparative Example 2 were added 0.1 part by weight of a commercially available water-reducing agent (main component=hydroxycarboxylic acid salt), 1.0 part of weight of calcium chloride, and 50 parts by weight of Toyoura standard stand, and water was added to the mixture so that the flow value was 220±10 mm. Then it was mixed and the formed mortar was cured for 24 hours at a temperature shown in Table 5. The compressive strength of the hardened mortar was tested, and the results are shown in Table 5.

TABLE 5

| | Tested Cement | Curing Temperature (°C.) | Compressive Strength (kgf/cm$^2$) |
|---|---|---|---|
| Example 12 | Cement of Example 1 | 45 | 1103 |
| Example 13 | | 65 | 1230 |
| Example 14 | | 80 | 1425 |
| Comparative Example 12 | | 30 | 820 |
| Comparative Example 13 | Cement of Comparative Example 2 | 45 | 977 |
| Comparative Example 14 | | 65 | 1052 |
| Comparative Example 15 | | 80 | 1124 |

With respect to each of the hardened mortars obtained by the heat curing in Examples 12 through 14, glass plates were bonded to both ends and score lines were formed. The mortar was stored for 1 day in a moisture box and the base length was measured. Then the mortar was allowed to strage under the conditions of a temperature of 20° C. and a relative humidity of 50%, and the change of the length was measured. As a result, it was confirmed that the dry shrinkage (length change ratio) was considerably reduced as the curing temperature was raised.

What is claimed is:

1. A heat curing cement composition comprising 60 to 75% by weight of 3CaO.SiO$_2$, in which the total content of 3CaO.Al$_2$O$_3$ and 4CaO.Al$_2$O$_3$.Fe$_2$O$_3$ is lower than 10% by weight, the alkali content is lower than 0.2% by weight as the Na$_2$O equivalent, the balance is composed mainly of 2CaO.SiO$_2$ and gypsum, and the Blain specific surface area is 3500 to 5500 cm$^2$/g.

2. A heat-curing cement composition as set forth in claim 1, wherein the SO$_3$ content in the cement is 1.0 to 2.0% by weight.

3. A hardened paste, mortar or concrete formed by curing under a high temperature of 35 to 85° C. a heat-curing cement composition comprising 60 to 75% by weight of 3CaO.SiO$_2$, in which the total content of 3CaO.Al$_2$O$_3$ and 4CaO.Al$_2$O$_3$Fe$_2$O$_3$ is lower than 10% by weight, the alkali content is lower than 0.2% by weight as the Na$_2$O equivalent, the balance is composed mainly of 2CaO.SiO$_2$ and gypsum, and the Blain specific surface area is 3500 to 5500 cm$^2$/g.

4. A heat-curing cement composition as set forth in claim 1, wherein up to 50% by weight of the cement composition is substituted by blaSt furnace slag.

5. A heat-curing cement composition as set forth in claim 1, wherein up to 30% by weight of the cement composition is substituted by fly ash or silica fume.

* * * * *